United States Patent [19]

von Schwerdtner et al.

[11] Patent Number: 4,506,860
[45] Date of Patent: Mar. 26, 1985

[54] FLOW CONTROL VALVE, ESPECIALLY FOR USE IN CONTROLLING THE OPERATION OF STEAM TURBINES

[75] Inventors: Otto von Schwerdtner; Hans Judith, both of Muehlheim, Fed. Rep. of Germany

[73] Assignee: Kraftwork Union AG, Muhlheim an der Ruhr, Fed. Rep. of Germany

[21] Appl. No.: 419,787

[22] Filed: Sep. 20, 1982

[30] Foreign Application Priority Data

Sep. 22, 1981 [DE] Fed. Rep. of Germany ....... 3137710

[51] Int. Cl.³ ............................................. F16K 1/42
[52] U.S. Cl. .................................. 251/124; 251/118; 251/359
[58] Field of Search ............... 251/124, 123, 122, 127, 251/126, 118, 359; 137/15.1, 15.2; 138/37, 39, 45

[56] References Cited

U.S. PATENT DOCUMENTS

| | | | |
|---|---|---|---|
| 2,061,852 | 11/1936 | Schweitzer | 251/122 |
| 2,598,187 | 5/1952 | Meyer | 251/126 |
| 3,730,224 | 5/1973 | Prisk | 251/118 |
| 4,131,134 | 12/1978 | Lindberg | 137/808 |

OTHER PUBLICATIONS

Appendix "Dampfturbinen Grosser Leistung" (Steam Turbines With High Capacity to Siemens–Zeitschrift (Siemens Magazine) 41' 1967, at pp. 75–76.

Primary Examiner—Arnold Rosenthal
Attorney, Agent, or Firm—F. W. Powers; J. L. James

[57] ABSTRACT

A flow control valve, especially for use in controlling the operation of a steam turbine, includes a valve seat arranged in the interior of a valve housing, and a diffusor arranged downstream of the valve seat, as well as a valve member which is mounted in a valve member guide toward and away from the valve seat to accordingly throttle the flow of steam or a similar medium through the interior of the valve housing and into the diffusing channel of the diffusor. Minimization of alternating forces tending to excite the valve member into oscillating and stabilization of the flow of the medium in the channel disposed downstream of the valve seat are achieved by the provision of internal ribs within such a channel. At least three such ribs are provided, projecting at least substantially in the respective radial directions or parallel thereto from the surface bounding such channel. The ribs commence at the area of smallest flow-through cross section of the channel and extend therefrom substantially parallel to the axial direction into the upstream portion of the diffusing channel. The axial length of the ribs is preferably in the range of between 1 and 1.5 times the diameter of the channel at the area of the smallest flow-through cross section. The free inner ends of the ribs are spaced from one another, and a cylindrical holding sleeve may be arranged therebetween and connected thereto.

9 Claims, 5 Drawing Figures

FLOW CONTROL VALVE, ESPECIALLY FOR USE IN CONTROLLING THE OPERATION OF STEAM TURBINES

BACKGROUND OF THE INVENTION

The present invention relates to valves in general, and more particularly to flow control valves especially suited for use in controlling the operation of steam turbines.

There are already known various constructions of flow control valves of the above type, among them such in which a valve member is slidably guided in a valve member guide arranged in the interior of a valve housing for movement toward and away from a valve seat which is provided in the housing, and in which a diffusing channel is arranged downstream of the valve seat.

A flow control valve of this construction is disclosed, for instance, in the Appendix "Dampfturbinen grosser Leistung" (Steam Turbines with High Capacity) to Siemens-Zeitschrift (Siemens Magazine) 41 (1967), pp. 75 and 76. Such flow control valves should, on the one hand, achieve a desired throttling effect as a result of the adjustment of the position of the valve member within its adjustment stroke and, on the other hand, cause as low energy losses as possible in the fully open, that is, inoperative position of the valve member. In addition, the forces needed for the displacement of the valve member between its positions should be kept relatively low, in view of the practical limitations on the structural dimensions and power of the associated displacement drives operative for displacing the valve member and maintaining the same in the desired position.

In the single seat valves which are most frequently used in the design and construction of steam turbines, the required displacement forces are kept relatively low by choosing the diameter of the valve member to be relatively small. However, since the valve seat has to have correspondingly small dimensions, there are encountered relatively high flow speeds in the area of smallest flow-through cross section which is situated at or immediately downstream of the valve seat, even when the valve member is in its fully open or inoperative position. In order to keep the energy losses in the conduits arranged downstream of the valve at a low level, the flow speed is then decelerated with minimum losses in the diffusing channel disposed downstream of and immediately following the valve seat or the smallest flow-through cross section area. When the internal configuration of the flow control valve is as described above, so that it can be considered to constitute a converging-diverging channel, then the lowest pressure in the medium flowing through the flow control valve occurs at the area of smallest flow-through cross section, and the pressure then increases as the medium flows in the downstream direction through the diffusing channel.

When the flow of the medium, such as steam, through the flow control valve is to be throttled, for controlling or regulating the operation of a machine, suh as a steam turbine, arranged downstream of the flow control valve, the valve member is displaced out of its inactive position toward the valve seat. This results in a restriction of the flow-through cross-sectional area available for the flow of the medium between the valve member and the valve seat, but also in a change in the flow pattern of the medium downstream of the valve seat and in the diffusing channel. More particularly, the flow of the medium through the diffusing channel becomes detached from the surface bounding the diffusing channel. This phenomenon becomes progressively more pronounced as the valve member approaches the valve seat. The excessive speeds in the stream of the medium are then reduced by turbulence in the stream. As the degree of throttling of the stream of the medium flowing through the flow control valve increases, there are increasingly encountered supersonic speeds in the flow of the medium downstream of the valve seat. Such supersonic speeds are then reduced by surging shocks. However, both of the above-discussed forms of flow deceleration or production of losses, that is, either by turbulence or by surging shocks, cause a highly destablized flow pattern with a pronounced macroturbulence, with pulsation, and with to and from oscillation of the flow of the medium which has initially proceeded through the region of and immediately downstream of the valve seat in a streamlined fashion. The pressure variations resulting from these phenomena then act as undesirable oscillatory excitations on the valve member.

Particularly pronounced oscillations can occur even when the degree of throttling is relatively low. It is characteristic for the flow through the diffusing channel that the beginning or upstream end of the detachment of the flow from the surface bounding the diffusing channel extends along an irregular and constantly changing course, inasmuch as stochastic exchange occurs between the flow which is still attached and the flow which already became detached. The disruptions in the gradual pressure increase in the diffusing channel, which result from the above conditions, and the pronounced pressure shocks or pulses resulting therefrom, also act as oscillatory excitations on the valve member.

SUMMARY OF THE INVENTION

Accordingly, it is a general object of the present invention to avoid the disadvantages of the prior art.

More particularly, it is an object of the invention to provide a flow control valve of the type here under consideration which does not possess the disadvantages of the conventional flow control valves of this type.

It is still another object of the present invention so to construct the flow control valve of the above type as to minimize the forces capable of exciting the valve member into oscillating.

Yet another object of the present invention is to so design the flow control valve as to be simple in construction, inexpensive to manufacture, easy to use, and reliable in operation nevertheless.

In pursuance of these objects and others which will become apparent hereafter, one feature of the present invention resides in a flow control valve, especially for use in controlling the operation of a steam turbine, comprising a valve housing having a valve seat and bounding a chamber situated upstream, and a diffusing channel situated downstream, of said valve seat as considered in the direction of flow of a medium through the valve; a valve member accommodated in said chamber and mounted on said valve housing for movement toward and away from said valve seat with attendant throttling of the flow of the medium between said valve member and said valve seat; and at least three projecting portions protruding at least substantially radially inwardly from said housing downstream of said valve seat and extending in the axial direction from the area of smallest flow-through cross section into the diffusing channel.

The present invention is based on the recognition of the fact that the provision of the channel which is situated downstream of the valve seat with internal projecting portions or ribs leads to a stabilization of the flow of the medium through the channel, when the projecting portions protrude radially or predominantly radially into the channel and when they extend in the axial direction of the channel from the area of the smallest cross section into the diffusing channel. Consequently, the alternating forces which have a tendency to excite the valve member into oscillations are minimized by the provision of such internal projecting portions or ribs.

In a currently preferred construction of the flow control valve according to the present invention, the inwardly extending projecting portions or ribs stop short of the longitudinal axis of the channel or, in other words, they have free end portions which are remote from the valve housing and which are outwardly spaced from the longitudinal axis. In this construction, it is purposely abstained from interconnecting the projecting portions or ribs at their inner ends, that is, at the region of the longitudinal axis of the channel, in view of the different thermal expansions of the projecting portions or ribs during transient temperature changes of the medium flowing past the same. In this context, it is especially advantageous for the stabilization function of the projecting portions or ribs when the inner free ends of the projecting portions or ribs extend, in accordance with a further advantageous facet of the present invention, in the axial direction parallel to the longitudinal axis of the channel.

However, in accordance with a further advantageous facet of the present invention, the projecting portions or ribs, which still extend substantially or predominantly radially, may have free end portions that are remote from the valve housing and that are tangentially mounted on a holding cylinder or sleeve which is arranged coaxially to the longitudinal axis of the channel. In this manner, there is obtained a connection of the inner free ends of the ribs or projecting portions which is movable when the ribs or projecting portions are subjected to heat or to heat variations, inasmuch as the same or similar thermal expansions of the projecting portions or ribs are compensated for by a corresponding turning of the holding sleeve.

It is also advantageous for the stabilization of the flow through the channel when the projecting portions or ribs are uniformly or equidistantly distributed over the circumference of the channel.

In accordance with a further advantageous concept of the present invention as embodied in the above-discussed flow control valve, it is provided for the axial length of the projecting portions or ribs to be substantially in the range between 1 and 1.5 times the diameter of the channel at its smallest flow-through cross section. As has been established by experiments, an especially stable flow pattern is obtained when the ribs or projecting portions have the above-mentioned range of axial length.

It is also advantageous when the valve housing also bounds a substantially cylindrical channel section situated between the area of the smallest flow-through cross section and the diffusing channel, and when the projecting portions or ribs also extend through this cylindrical channel section and then into the diffusing channel. The cylindrical channel section, which extends between the area of the smallest flow-through cross section and the diffusing channel, then acts as an additional quieting zone for the flow of the medium. In addition thereto, the cylindrical channel section increases the distance between the region of the diffusing channel, which is especially prone to developing the aforementioned disturbances or instabilities in the flow of the medium therethrough, and the valve member.

It is additionally advantageous, especially for the ease of providing the internal ribs in the channel downstream of the valve seat, when the valve housing includes a main body bounding a passage at the region of the valve seat, and a separate valve seat sleeve or insert accommodated in this passage and at least partially bounding the channel. In this construction, the projecting portions or ribs are fully provided in the interior of the valve seat sleeve or insert.

A particularly advantageous construction of the flow control arrangement is obtained when there is further provided a valve member guide extending from the valve housing into the chamber and toward the valve seat and slidingly receiving and guiding the valve member. When this expedient is used, any remaining tendency of the valve member to oscillate or flutter is effectively counteracted by the valve member guide.

BRIEF DESCRIPTION OF THE DRAWING

Further details of the construction and mode of operation of the flow control valve according to the present invention will become apparent from the accompanying drawing, in which.

DETAILED DESCRIPTION OF THE PREFERRED EMBODIMENTS

Figure 1:
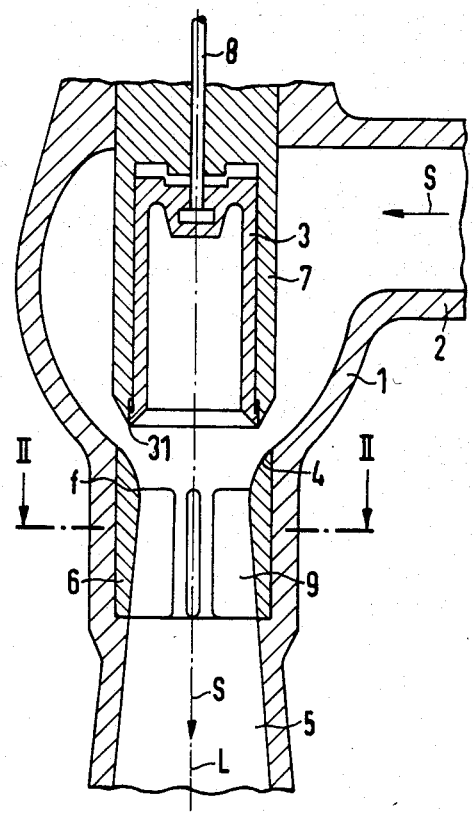
FIG. 1 is a somewhat diagrammatic partial axially sectioned side elevational view of a flow control valve constructed in accordance with the present invention with ribs downstream of the valve seat.

Referring now to the drawing in detail, and first to FIG. 1 thereof, it may be seen that the reference numeral 1 has been used therein to identify a valve housing of a flow control valve. Arrows S indicate the flow of a medium, especially of steam, through the interior of the valve housing 1. The medium enters the interior of the valve housing 1 through a laterally arranged inlet port or nipple 2, then flows through an annular gap between a conical lip 31 of a valve member 3 and a valve seat 4, and finally flows out of the interior of the valve housing 1 in the downward direction, as considered in the position of the valve housing 1 as shown in FIG. 1. The discharge region of the valve housing 1 is constructed as a diffusing channel or diffusor 5.

The internal configuration of the valve housing 1 may be that of a converging-diverging channel. The valve seat 4 is then arranged in the converging part of the channel, upstream of the area of the smallest cross section of the channel. The diverging part of the channel is constituted by the diffusor 5. As illustrated in the drawing, the contour of the converging-diverging channel is formed at the region of the valve seat 4, the smallest flow-through cross section area f and the upstream end of the diverging channel by a valve seat sleeve 6. The valve seat sleeve 6 is made of a wear-resistant material and is accommodated in a corresponding recess or passage of the main body of the housing 1 so as to form a part of the latter.

The valve member 3 is constructed as a piston and is guided for movement in the axial direction in a valve member guide 7 which is constructed as a cylinder and which is fixedly arranged in the interior of the valve housing 1. The position of the valve member 3 within its range of displacement, which determines the extent of the throttling of the flow S of the medium, especially steam, through the interior of the valve housing 1, is adjusted in the direction of the longitudinal axis L of the valve housing 1 by means of a valve spindle or shank 8 which is positively connected with the valve member 3, and an adjusting drive which has been omitted from the drawing, in order not to unduly encumber the same, since it is of a conventional construction.

Figure 2:
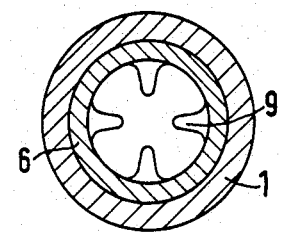
FIG. 2 is a cross-sectional view taken along line II—II of FIG. 1.

Now, in order to minimize the occurrence of alternating or pulsating forces which could excite the valve member 3 into oscillating, four ribs 9 in total are arranged in the channel which is arranged downstream of the valve seat 4. The constuction and arrangement of the four ribs 9 will be most clearly perceived when the cross-sectional view of FIG. 2 is considered in conjunction with FIG. 1. These four ribs 9, which are angularly spaced from one another by 90° as between each two adjacent ones of the ribs 9 as considered in the circumferential direction, protrude in the radial directions from the surface bounding the channel in the valve seat sleeve 6. The ribs 9 are separated from one another at the region of their imaginary crossing, that is, they respectively terminate short of or at a predetermined small spacing from the longitudinal axis L of the valve housing 1. As considered in the axial direction along the longitudinal axis L, the four ribs 9 commence at the area of the smallest flow-through cross section f and extend therefrom all the way to the downstream end of the valve seat sleeve 6 and thus into the diffuser 5.

The inwardly disposed free ends of the ribs 9 extend parallel to the longitudinal axis L as considered in the axial direction, so that, due to the trapezoidal configuration of the spaces between the ribs 9, there is obtained the largest possible stabilization surface for the flow S of the medium or steam which has an especially pronounced tendency to form instabilities and disturbances at this region.

Figure 3:
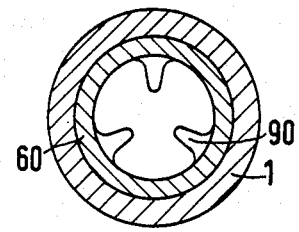
FIG. 3 is a view similar to that of FIG. 2 but showing a modification of the ribs.

FIG. 3 depicts a first modification of the rib arrangement provided for the stabilization of the stream of steam or a similar medium. FIG. 3 shows, in a cross-sectional view similar to that of FIG. 2 through the channel provided with the internal rib arrangement, that only three ribs 90 are provided in this modified construction. The three ribs 90 are angularly displaced from one another by 120° as considered in the circumferential direction. The three ribs 90 protrude from the internal surface of a valve seat sleeve 60, which bounds a channel and which is inserted into a corresponding passage or recess of the valve housing 1, in the radial directions. In all other respects, the arrangement and configuration of the ribs 90 of FIG. 3 correspond to those of the ribs 9 illustrated particularly in FIG. 2 but also in FIG. 1.

Figure 4:
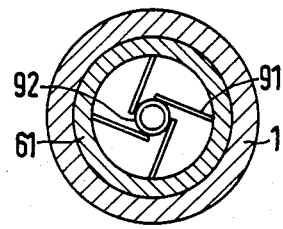
FIG. 4 is another view also similar to that of FIG. 2 but showing a different modification of the ribs.

FIG. 4 shows, in a highly simplified diagrammatic manner, a second modification of the rib arrangement for stabilizing the flow of the steam or similar medium through the valve housing 1. In this modified construction, there are provided altogether four ribs 91. The ribs 91 protruded from the internal surface of a valve seat sleeve 61, which bounds a channel and which is again accommodated in a passage or recess of the valve housing 1, in substantially radial directions. However, the ribs 91 are transversely offset from true radial planes and extend substantially parallel thereto, so that their free end portions remote from the valve seat sleeve 61 extend tangentially to a holding cylinder or sleeve 92 which is coaxially arranged within the valve seat sleeve or insert 61. The inwardly located free end portions of the ribs 91 are connected, in any conventional manner, with the holding sleeve 92 and, in this manner, the ribs 91 are connected with each other. However, this connection of the individual ribs 91 with one another by means of the holding sleeve 92 is to be considered to constitute a heat-yieldable connection, inasmuch as heat-related expansions and contractions of the material of the individual ribs 91 are compensated for and counteracted by corresponding expansion or contraction of the material of the holding sleeve 92, or by turning of the latter about its axis.

Figure 5:
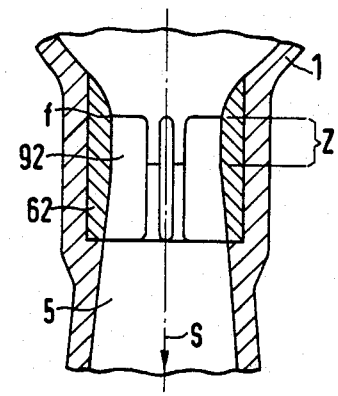
FIG. 5 is a view akin to that of FIG. 1 but showing only a fragment with a modified configuration of the channel provided with the ribs.

Finally, FIG. 5 shows an additional modification which resides in the change of the configuration of the channel which is equipped with the rib arrangement. In contradistinction to the configuration which is illustrated in FIG. 1, in the construction according to FIG. 5 there is provided a valve seat sleeve 62 within which there is formed a cylindrical channel section, identified by the reference character Z, which is situated between the area of the smallest flow-through cross section f and the upstream end of the diffusing channel of the diffusor 5. In correspondence with this construction, the ribs, here identified by the reference numeral 93, extend in the axial direction from the area of the smallest flow-through cross section f through the cylindrical channel section Z that adjoins the latter in the downstream direction, into the diffuser 5. In this construction, the cylindrical channel section Z serves as an additional quieting region for the flow of the stream through the valve housing 1, on top of the stabilizing function of the ribs 93.

There has thus been shown and described a novel flow control valve which fulfills all the objects and advantageous sought therefore. Many changes, modifications, variations and other uses and applications of the subject invention will, however, become apparent to those skilled in the art after considering this specification and the accompanying drawings disclose preferred embodiments thereof. All such changes, modifications, variations and other uses and applications which do not depart from the spirit and scope of the invention are deemed to be covered by the invention which is limited only by the claims which follow.

What is claimed is:

1. A flow control valve, especially for use in controlling the operation of steam turbines, comprising:
   a valve housing having a valve seat and bounding a chamber situated upstream, and a difussing channel situated downstream, of said valve seat as considered in the direction of flow of a medium through the valve;
   a valve member accomodated in said chamber and mounted on said valve housing for movement towards and away from said valve seat with attendant throttling of the flow of the medium between said valve member and said valve seat;

at least three projecting portions protruding at least substantially radially inwardly from said housing downstream of said valve seat and extending in the axial direction from the area of smallest flow-through cross section into the diffusing channel; and a holding sleeve, wherein said projecting portions have free ends remote from said valve housing and extending substantially tangentially of and connected to said holding sleeve to hold the same in a coaxial position within said difussing channel.

2. The flow control valve as defined in claim 1, wherein said projecting portions are ribs integral with said valve housing.

3. The flow control valve as defined in claim 1, wherein said projecting portions have free ends remote from said valve housing and outwardly spaced from the axis of said diffusing channel.

4. The flow control valve as defined in claim 2, wherein said free ends of said projecting portions extend substantially parallel to the axis of said diffusing channel.

5. The flow control valve as defined in claim 1, wherein said projecting portions are uniformly distributed over the circumference of said diffusing channel.

6. The flow control valve as defined in claim 1, wherein said projecting portions have axial lengths substantially corresponding to 1 to 1.5 times the diameter of said diffusing channel at said area of smallest flow-through cross section.

7. The flow control valve as defined in claim 1, wherein said valve housing also bounds a substantially cylindrical channel section situated between said area of smallest flowthrough cross section and said diffusing channel; and wherein said projecting portions also extend through said cylindrical channel section.

8. The flow control valve as defined in claim 1, wherein said valve housing includes a main body bounding a passage at the region of said valve seat, and a separate valve seat sleeve accommodated in said passage and at least partially bounding said diffusing channel; and wherein said projecting portions are fully situated within said valve seat sleeve.

9. The flow control valve as defined in claim 1, and further comprising a valve member guide extending from said valve housing into said chamber and toward said valve seat and slidingly receiving and guiding said valve member.

* * * * *